(12) United States Patent
Dietrich

(10) Patent No.: US 11,105,355 B2
(45) Date of Patent: Aug. 31, 2021

(54) CONNECTING DEVICE

(71) Applicant: Manuel Dietrich, Hard (AT)

(72) Inventor: Manuel Dietrich, Hard (AT)

(73) Assignee: Wolfgang Held, Hard (AT)

( * ) Notice: Subject to any disclaimer, the term of this patent is extended or adjusted under 35 U.S.C. 154(b) by 143 days.

(21) Appl. No.: 16/341,890

(22) PCT Filed: Oct. 11, 2017

(86) PCT No.: PCT/EP2017/075981
§ 371 (c)(1),
(2) Date: Apr. 13, 2019

(87) PCT Pub. No.: WO2018/069414
PCT Pub. Date: Apr. 19, 2018

(65) Prior Publication Data
US 2019/0242420 A1 Aug. 8, 2019

(30) Foreign Application Priority Data
Oct. 14, 2016 (DE) ...................... 10 2016 119 629.0

(51) Int. Cl.
*F16B 12/20* (2006.01)
*F16B 12/24* (2006.01)
*F16B 13/08* (2006.01)

(52) U.S. Cl.
CPC .......... *F16B 12/2027* (2013.01); *F16B 12/20* (2013.01); *F16B 12/2009* (2013.01);
(Continued)

(58) Field of Classification Search
CPC ...... A47B 2095/006; A47B 2230/0033; A47B 2230/0044; A47B 2230/0048;
(Continued)

(56) References Cited

U.S. PATENT DOCUMENTS 6,106,185 A 8/2000 Isele et al.
6,234,596 B1 5/2001 Egger
(Continued)

FOREIGN PATENT DOCUMENTS

CN 201448322 U * 5/2010 .......... F16B 12/2036
DE 1901533 A 8/1970
(Continued)

OTHER PUBLICATIONS

The International Search Report (with English translation) and the Written Opinion (in German) of the International Searching Authority, or the Declaration for International Application No. PCT/EP2017/075981, dated Jan. 8, 2018.

*Primary Examiner* — Josh Skroupa
(74) *Attorney, Agent, or Firm* — Brett A. Schenck

(57) ABSTRACT

A connecting device having a hollow-body-like plug-in part which is of variable outer circumference and which interacts with a fixing device which is at least partially insertable into the plug-in part, wherein the fixing device is connectable to an actuation section which projects out of the plug-in part. Here, the plug-in part, with the fixing device inserted therein and with the actuation section connected thereto, has the minimum external shape thereof in terms of the dimensions thereof when the actuation section is in a rest position. The actuation section is moved by means of axial or radial movement relative to the plug-in part into a working position in which the plug-in part has the maximum external shape thereof in terms of the dimensions thereof, wherein the plug-in part has a closed shape on its side situated opposite the insertion side of the fixing device.

11 Claims, 1 Drawing Sheet

(52) U.S. Cl.
CPC .......... *F16B 12/24* (2013.01); *F16B 13/0825* (2013.01); *A47B 2230/0033* (2013.01); *A47B 2230/0044* (2013.01); *A47B 2230/0048* (2013.01); *A47B 2230/0051* (2013.01); *F16B 2012/209* (2013.01)

(58) Field of Classification Search
CPC ............. A47B 2230/0051; F16B 12/20; F16B 12/2009; F16B 12/2027; F16B 12/2036; F16B 12/24; F16B 13/0825; F16B 2012/103; F16B 2012/209; Y10T 403/557; Y10T 403/7071; Y10T 403/76
USPC ................... 403/297, 374.5, 409.1, DIG. 12
See application file for complete search history.

(56) References Cited

U.S. PATENT DOCUMENTS

| | | | | |
|---|---|---|---|---|
| 6,257,796 | B1 * | 7/2001 | Salice ................. | F16B 12/2009 403/231 |
| 10,605,286 | B2 * | 3/2020 | Giovannetti ........ | F16B 12/2027 |
| 2007/0160418 | A1 * | 7/2007 | Lo ........................... | F16B 12/24 403/275 |
| 2008/0084143 | A1 * | 4/2008 | Ho ...................... | F16B 12/2009 312/111 |
| 2009/0206613 | A1 * | 8/2009 | Hawang ............... | F16B 12/2009 292/57 |
| 2010/0202852 | A1 * | 8/2010 | Krause ................ | F16B 12/2027 411/272 |
| 2015/0252831 | A1 | 10/2015 | Deman | |
| 2019/0055973 | A1 * | 2/2019 | Nitschmann ............ | F16B 12/20 |

FOREIGN PATENT DOCUMENTS

| | | | | |
|---|---|---|---|---|
| DE | 2153426 | A1 | 5/1972 | |
| DE | 2546751 | A1 * | 4/1977 | .......... F16B 12/2027 |
| DE | 7711677 | U1 | 8/1977 | |
| DE | 2721403 | A1 | 11/1978 | |
| DE | 2610200 | C3 | 1/1980 | |
| DE | 29722265 | U1 * | 3/1998 | ............. F16B 12/24 |
| DE | 29818651 | U1 | 2/1999 | |
| DE | 202009014811 | U1 | 2/2010 | |
| DE | 202009018418 | U1 | 8/2011 | |
| DE | 102009043179 | A1 | 9/2011 | |
| EP | 755640 | A1 * | 1/1997 | ............. F16B 12/20 |
| EP | 0878630 | A2 | 11/1998 | |
| FR | 2445461 | A * | 8/1980 | ............. F16B 12/24 |
| FR | 2561325 | A3 | 9/1985 | |
| GB | 2048419 | A | 12/1980 | |
| WO | WO2014041498 | A1 | 3/2014 | |

* cited by examiner

CONNECTING DEVICE

CROSS REFERENCE TO RELATED APPLICATIONS

The present Application is a national stage of International Patent Application No. PCT/EP2017/075981, titled "CONNECTING DEVICE", filed Oct. 11, 2017, which claims priority to German application no. DE 10 2016 119 629.0 filed on Oct. 14, 2016, the contents of which are incorporated by reference.

FIELD

The invention relates to a connecting device having an external shape that improves the static friction and is variable, as defined by the preamble to claim 1.

BACKGROUND

For separable and not-visible connection of mechanical components, screws, for instance, are disadvantageous, since when they are used, the result as a rule is visible holes. Conventional connecting devices often consist of a peg of enlarged head diameter, which is screwed blind into one of the components, and in which the head is fixed by a locking device in a second component to be connected to it. Furthermore, connecting devices are known that are screwed into a component blind by one end and by the other end are firmly clamped in a second component by enlarging their external diameter, for instance by sliding an internal, optionally conical element, on the principle of a dowel. The connecting device is spread most widely apart at its open front end and the least widely toward its back end.

In DE 19 01 533 A, a connecting device described as a dowel having a hollow-body-like plug-in part with two recesses in its wall is disclosed, in which, by rotation means of an actuation section of a fixing device from which the actuation section protrudes, and which fixing device has two partially oval portions and is located in a recess of the plug-in part, the wall is forced apart. However, the inside surface of the plug-in part is shaped in accordance with the outside surface of the fixing device in such a way that in the idle position of the fixing device, its body is received therein in its entirety, without spreading the plug-in part open. This document does not describe the reception of partially oval portions in the recesses in the idle position of the fixing device. A disadvantage here is that the inside surface of the plug-in part has to be shaped in such a way that in the idle position the fixing device must be located entirely therein and without being spread apart, and that in the working position of the fixing device, the shaping of the inside surface enables it to be spread apart. This makes the production of the connecting device more difficult and thus more expensive.

The published patent document GB 2 048 419 A describes a connecting device with a plug-in part and a fixing device located in the plug-in part, which connecting device has a female thread (actuation section) and two partly oval portions. Accordingly, the plug-in part in its wall has two recesses. In the function of the connecting device, a threaded rod is screwed into the fixing device, as a result of which the fixing device moves in the direction of the end of the plug-in part that is opposite the insertion end of the threaded rod. Rotation of the fixing device is prevented because of the disposition of the partly oval section in the recesses of the wall of the plug-in part, and as a result, the axial displacement of the fixing device is made possible for the first time. By means of the axial displacement, the axially conically shaped fixing device is moved in the likewise axially conically shaped inside surface of the wall of the plug-in part; this causes the wall to be pushed apart. Once again, the connecting device is expensive to produce.

From DE 2 721 403 A1 or DE 7 711 677 U, a cylindrical dowel for connecting two components is known which is open on its front end and axially lengthwise. Toward the front end, the dowel has a reduced inside diameter over a portion of its axial extent. By hammering in a cylindrical expansion element the diameter of which is equivalent to the inside diameter of the dowel toward the back end over a portion of its axial extent and is larger than the inside diameter toward the front end, expansion takes place by the familiar principle of the dowel. For inserting the expansion element, an additional aid is needed and the dowel is expanded more toward the front end than toward the back end.

DE 20 2009 018 418 U1 describes a furniture fitting for separably connecting two pieces of furniture using one fastening element. The fastening element is embodied in the form of a cylindrical dowel that is open both on its front end and in its axial extent, and that is movable by means of a grip element relative to a fixed cylindrical peg. By means of the grip element, the dowel is moved across the peg, as a result of which the dowel, opened on its front end, is expanded by means of the known principle.

In DE 20 2009 014 811 U1, a furniture fitting for separable connection of two pieces of furniture is described. The fitting has fastening elements which are equipped with a dowel that is expandable and that is open on its front end and in its axial extent. The part of the fastening element that is provided with the dowel is tiltable by 90 degrees relative to the remainder of the fastening element, and by way of an external mechanism, the dowel can either be relaxed or spread apart.

From EP 0 878 630 A2, a furniture fitting is known that has an expandable dowel that is open on its front end and in its axial extent and that by retracting the expansion part from the front end of the dowel in the direction of its back end spreads the dowel apart in the known manner. The expansion part is connected to an eccentric lever.

DE 2 610 200 C3 describes a fitting for separable connection of two components having an expandable connecting link, which is open on its front end and in its axial extent. The connecting link can be expanded with a pintle that which is located in the connecting link and that widens conically on one end. On its other end, the pintle has a widened head, which is received in a locking element and is moved by that element. The expansion of the connecting link and of the pintle is stopped as a result.

In DE 2 153 426 A, a furniture fitting is described that has an expandable peg which is split in two axially and is open on its front end, and in which a rotatable eccentric expansion element is located. Turning the expansion element causes a part of the fastening peg that is split in two to be expanded outward.

From DE 29 818 651 U1, a fastening device for fastening a front screen onto door or window frames is known that has an expansion dowel, which is open on its front end and in its axial extent and in which an expanding screw that is flattened on two sides is located. Turning the expanding screw 90 degrees causes the expanding bell to be spread apart.

It is the object of the invention to improve known connecting devices in such a way that a separable and possibly non-visible connection of two components can easily be accomplished and manufactured.

This object is attained by the features of claim 1.

SUMMARY

This is attained in that in a connecting device having an external shape that improves static friction and is variable, the connecting device has a plug-in part with an at least partly hollow, flexible and at least on its front end closed shape. A movable fixing device is located in the interior of the plug-in part and can be connected to an actuation section. In a idle position of the actuation section, the plug-in part has unaltered external dimensions in comparison to the plug-in part without the fixing device received in it. By means of the fixing device, a largely uniformly distributed force is generated in a majority of the axial and radial extent of the plug-in part. In conjunction with the component to be connected, this produces a corresponding static friction. Since the inside surface of the plug-in part need not be adapted to the outside surface of the fixing device, the production of the connecting device is simplified and thus economical.

Advantageous refinements of the connecting device can be learned from the dependent claims.

The fixing device is at least partly hollow. This makes it possible, in use as a connecting device, for instance to support the fixing device and the connecting device simply and securely in a single housing.

The fixing device and the actuation section are in one piece. This enables the use of the connecting device without the additional use of a tool.

The fixing device and the actuation section are in two pieces. For use of the connecting device, an additional tool is needed, but this makes space-saving use possible.

The fixing device is rotatably supported in the connecting device. Because it requires little space in the axial direction of the connecting device, this embodiment has advantages.

The fixing device is supported displaceably in the connecting device. Because it requires little space in the radial direction of the connecting device, this embodiment has advantages.

The outer shape of the connecting device has a threadlike structure and/or knoblike or pyramidal or cylindrical structures. Depending on the surface structure of the component to be connected, the structure can be adapted to suit the external shape of the connecting device.

The actuation section has a partly flattened shape or a partially perforated shape, as a result of which an object can be secured directly in it.

The connecting device has at least two recesses in a wall, in which recesses at least two partly oval portions of the fixing device are received in the idle position of the actuation section. As a result, in its dimensions, the connecting device has its minimum external shape. In the working position of the actuation section, the partially oval portions can be moved out of the recesses. As a result, the wall is pushed apart, and the connecting device has its maximal external shape in terms of its dimensions.

In conjunction with the accompanying drawings, the invention will be described in further detail in terms of an exemplary embodiment of the invention.

DETAIL DESCRIPTION

Figure 1:
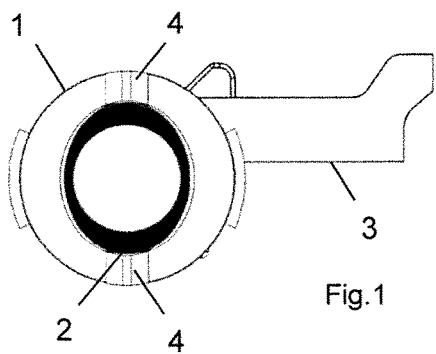
FIG. 1 shows a plan view in radial section of the plug-in part and the fixing device, located in it in the idle position.
Figure 2:
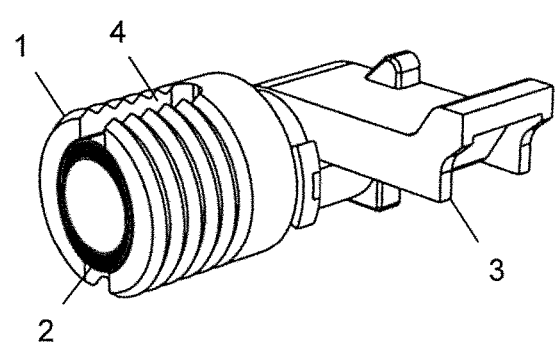
FIG. 2 shows a perspective view in radial section of the plug-in part and the fixing device, located in it, in the idle position.

FIGS. 1 through 8 show a first embodiment of the invention. FIGS. 1 and 2, in a plan view and a perspective view, respectively, both in radial section, show the plug-in part 1 with the fixing device 2 located in it in the idle position; two partly oval portions are received in two recesses 4 of the plug-in part 1. Because of the recesses 4 that extend over almost the entire axial extent of the plug-in part 1 and because of the approximately equal length of the partly oval portions which are entirely received therein, the connecting device in this position has its minimum external dimension in the radial direction.

Figure 3:
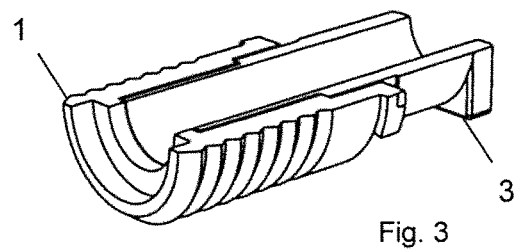
FIG. 3 shows a perspective view in axial section of the plug-in part and the fixing device located in it in the idle position.
Figure 4:
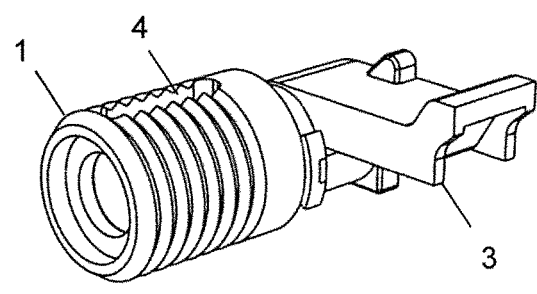
FIG. 4 shows a perspective view of the plug-in part and the fixing device located in it in the idle position.

FIGS. 3 and 4 show the plug-in part 1 and the fixing device 2 located in it in the idle position in an axially sectional and completely closed perspective view, respectively.

In FIG. 3, a hollow embodiment of the fixing device 2 can be seen, as a result of which the plug-in part 1 and the fixing device 2 can be supported for instance in a housing by inserting a screw bolt, for instance, and connected to the housing.

In FIGS. 1, 2 and 4 through 8, an actuation section 3 embodied in one piece with the fixing device 2 can be seen, which makes it possible to rotate the fixing device 2 by 90 degrees inside the connecting device. The actuation section 3 is embodied here in the form of a lever, so that the plug-in part 1, with the fixing device 2 located in it and with the lever formed onto it, can for instance serve to connect two components. For instance, for a front panel and a lateral part of the drawer. Alternatively, however, the actuation section 3 can also take a different shape, such as that of a handle element, which can then be installed on a drawer or a cabinet door, for instance. The fixing device 2 and the actuation section 3 can also be embodied in two pieces. For instance, the actuation section 3 can also be designed in the form of a tool or adjusting knob that can be made to engage the fixing device 2. In this embodiment, the structural size of the fixing device 2 is less, so that the plug-in part 1 with the fixing device 2 can be used in applications where there is little space.

Figure 5:
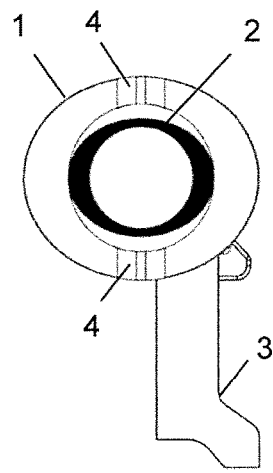
FIG. 5 shows a plan view in radial section of the plug-in part and the fixing device located in it in the working position.
Figure 6:
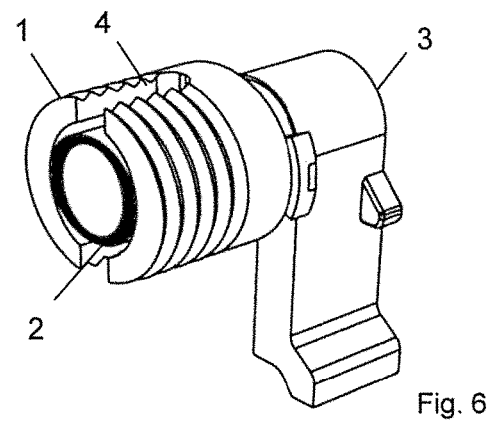
FIG. 6 shows a plan view in radial section of the plug-in part and the fixing device located in it in the working position.

FIGS. 5 and 6, in a plan view and perspective view, respectively, and in radial section, show the plug-in part 1 with the fixing device 2 located in it in the working position. The two partly oval portions have been unscrewed out of the two recesses 4 in the plug-in part 1 and force the sides of the hollow and flexible connecting device apart. Because the partly oval portions extend over almost the entire axial extent of the plug-in part 1 and because of the closed shape of the plug-in part 1 on its front end, a more-pronounced expansion of the plug-in part 1 at its front end compared to the back end is prevented. The force is then transmitted radially uniformly and over almost the entire axial length of the connecting device to the component, into which component the plug-in part 1 has been inserted. As a result, static friction that acts both radially uniformly and over almost the entire axial length of the plug-in part 1 is achieved. Because of the closed shape on the front end, the penetration of foreign bodies (such as splinters, slivers resulting from drilling, dirt) into the plug-in part 1 is also averted. This prevents an expansion of the plug-in part 1 caused by these foreign bodies during its introduction into a recess of a component to be connected and thus makes that procedure easier.

Figure 7:
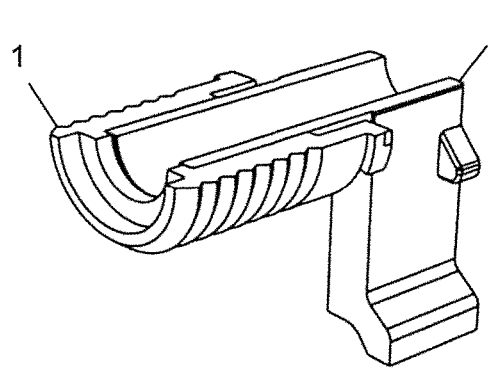
FIG. 7 shows a perspective view in axial section of the plug-in part and the fixing device located in it in the working position.
Figure 8:
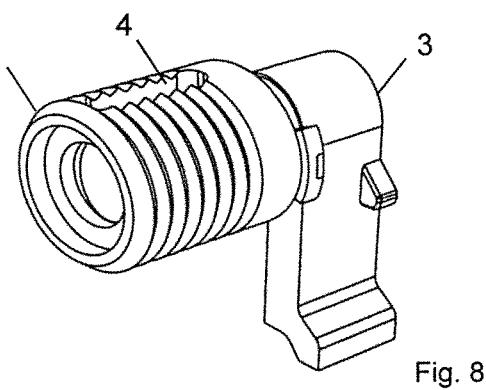
FIG. 8 shows a perspective view of the plug-in part and the fixing device located in it in the working position.

FIGS. 7 and 8 show the plug-in part 1 and the fixing device 2 located in it in the working position in an axially sectional and completely closed perspective view, respectively.

In a second embodiment, not shown, the fixing device 2 can also be embodied as displaceable. Then, in the idle position of the actuation section 3, a plurality of partly oval portions can be received radially and preferably also axially in the associated recesses 4, which are located in the radial and preferably also axial orientation of the plug-in part 1. In the working position of the actuation section 3, the partly oval portions have been thrust all the way out of the recesses. As a result, the wall of the plug-in part 1 is pushed apart, so that once again a radially uniform static friction, acting over almost the entire length of the connecting device 1, with the connected component is achieved.

The external shape of the plug-in part 1 can furthermore have a threadlike structure and/or button-like or pyramidal or cylindrical structures on its surface. As a result, the static friction between the plug-in part 1 and the surrounding component is additionally increased.

The external shape of the actuation section 3 can furthermore have a flattened or pierced part, which serves as a support for some object to be braced on it, or as an eyelet for an object to be suspended from. The actuation section 3 can for instance be part of a shelf support. In this case, the L-shaped shelf support, or a shelf support having some other form, can act as an actuation section 3. The fixing device 2 is located on the side of the shelf support facing toward the wall and is inserted into the plug-in part 1. By rotating the shelf support by 90°, the fixing device 2 clamps the plug-in part 1 to the wall.

LIST OF REFERENCE NUMERALS

1 Plug-in part
2 Fixing device
3 Actuation section
4 Recess

The invention claimed is:

1. A connecting device having a plug-in part of hollow-body type, which part improves the static friction and changes its outer circumference, and which cooperates with a fixing device that is at least partly insertable into the plug-in part, and the fixing device is connectable to an actuation section projecting out of the plug-in part,
wherein
the plug-in part, with the fixing device introduced into it and with the actuation section connected thereto, in an idle position of the actuation section has its minimum outer shape in its dimensions;
and wherein the actuation section with the fixing device, by an axial or ninety degree rotating motion relative to the plug-in part, is put in a working position, in which the plug-in part has its maximal external shape in its dimensions; and
wherein the plug-in part, on its end opposite an introduction end of the fixing device, has a closed shape.

2. The connecting device of claim 1,
wherein
the fixing device is at least partly hollow.

3. The connecting device of claim 1,
wherein
the fixing device and the actuation section are in one piece.

4. The connecting device of claim 2,
wherein
the fixing device and the actuation section are in two pieces.

5. The connecting device of claim 1,
wherein
the fixing device is rotatably supported in the plug-in part.

6. The connecting device of claim 1,
wherein
the fixing device is displaceably supported in the plug-in part.

7. The connecting device of claim 1,
wherein
the outer shape of the plug-in part has a threadlike structure or knoblike or pyramidal or cylindrical structures.

8. The connecting device of claim 1,
wherein
the actuation section has a partly flattened shape or a partly pierced shape.

9. The connecting device of claim 1,
wherein
the plug-in part has at least two recesses in a side in which recesses at least two partly oval portions of the fixing device are received in the idle position of the actuation section, and
that in the working position of the actuation section, the partly oval portions can be moved out of the recess.

10. The connecting device of claim 1, wherein the plug-in part has a first end and a second end opposite the first end, wherein the actuating section is introduced at the second end, wherein the plug-in part includes a recess, wherein the recess receives a portion of the fixing device in the idle position of the actuation section, and
that in the working position of the actuation section, the portion can be moved out of the recess, wherein the recess does not axially extend through the first end of the plug-in part.

11. The connecting device of claim 10, wherein the recess does not axially extend through the first and second ends of the plug-in part.

* * * * *